(12) United States Patent
Lurie

(10) Patent No.: US 9,573,763 B2
(45) Date of Patent: Feb. 21, 2017

(54) PIPE CONVEYORS

(71) Applicant: Martin S. Lurie, Englewood, CO (US)

(72) Inventor: Martin S. Lurie, Englewood, CO (US)

(73) Assignee: Thyssenkrupp Industrial Solutions (USA), Inc., Greenwood Village, CO (US)

( * ) Notice: Subject to any disclaimer, the term of this patent is extended or adjusted under 35 U.S.C. 154(b) by 0 days.

(21) Appl. No.: 14/777,186

(22) PCT Filed: Mar. 14, 2014

(86) PCT No.: PCT/US2014/029039
§ 371 (c)(1),
(2) Date: Sep. 15, 2015

(87) PCT Pub. No.: WO2014/144571
PCT Pub. Date: Sep. 18, 2014

(65) Prior Publication Data
US 2016/0039609 A1    Feb. 11, 2016

Related U.S. Application Data

(60) Provisional application No. 61/798,247, filed on Mar. 15, 2013.

(51) Int. Cl.
*B65G 15/08* (2006.01)
*B65G 23/14* (2006.01)
*B65G 23/32* (2006.01)
*B65G 23/44* (2006.01)

(52) U.S. Cl.
CPC .............. *B65G 15/08* (2013.01); *B65G 23/14* (2013.01); *B65G 23/32* (2013.01); *B65G 23/44* (2013.01)

(58) Field of Classification Search
CPC ......... B65G 15/08; B65G 23/14; B65G 23/32; B65G 23/44; B65G 19/24; B65G 19/14
USPC ........................................ 198/819, 716, 721
See application file for complete search history.

(56) References Cited

U.S. PATENT DOCUMENTS

| | | | | |
|---|---|---|---|---|
| 2,212,024 A * | 8/1940 | Johns | ................. | B65G 15/40 198/819 |
| 3,208,737 A * | 9/1965 | Brown | ................. | B01F 5/245 137/897 |
| 3,338,383 A * | 8/1967 | Hashimoto | ........... | B65G 15/40 198/819 |
| 3,586,156 A * | 6/1971 | Easley, Jr. | ............. | B65G 15/42 198/570 |
| 3,595,378 A * | 7/1971 | Kamisaka | ............. | B65G 15/40 198/690.2 |

(Continued)

*Primary Examiner* — William R Harp
(74) *Attorney, Agent, or Firm* — Dorsey & Whitney, LLP

(57) ABSTRACT

A conveyor system may include a pipe conveyor with a head end, a tail end, and an inclined section. The conveyor system may also include a conveyor belt including a first portion and a second portion. The conveyor belt may form a pipe shape when the first and second portions of the conveyor belt are overlapped. The pipe shape may extend from a pipe closing point to a pipe opening point and may enclose two or more longitudinally spaced-apart centering structures. The centering structures may allow for self-bridging of a bulk material carried in a pipe volume above each centering structure. Means of implementing this material-transport principle within a pipe conveyor system are described.

20 Claims, 12 Drawing Sheets

(56) References Cited

U.S. PATENT DOCUMENTS

| | | | | |
|---|---|---|---|---|
| 3,788,454 A * | 1/1974 | Emerson | ............... | B65G 19/14 198/716 |
| 3,881,590 A * | 5/1975 | Hartmann | ............... | B65G 15/14 198/626.4 |
| 4,535,884 A * | 8/1985 | Suppan | ............... | B65G 15/08 198/626.2 |
| 4,832,182 A * | 5/1989 | Wallace, Jr. | ............... | B65G 67/606 198/509 |
| 5,351,810 A * | 10/1994 | Tingskog | ............... | B65G 15/08 198/819 |
| 5,465,830 A * | 11/1995 | Tingskog | ............... | B65G 67/606 198/812 |
| 5,511,652 A * | 4/1996 | McGinnis | ............... | B65G 15/08 198/690.2 |
| 6,029,801 A * | 2/2000 | Odin | ............... | B65G 15/36 198/819 |
| 6,763,932 B2 * | 7/2004 | Stenson | ............... | B65G 15/08 198/550.5 |
| 2004/0149545 A1 * | 8/2004 | Tarantino | ............... | A01D 45/263 198/690.2 |
| 2012/0061212 A1 * | 3/2012 | Brewka | ............... | B65G 15/08 198/819 |

* cited by examiner

PIPE CONVEYORS

CROSS-REFERENCE TO RELATED APPLICATIONS

This application is a national stage application of International Application No. PCT/US2014/029039, filed Mar. 14, 2014, and entitled "PIPE CONVEYORS", which claims priority to U.S. Application No. 61/798,247, filed Mar. 15, 2013, and entitled "PIPE CONVEYORS", both of which are hereby incorporated by reference herein in their entireties for all purposes.

TECHNOLOGICAL FIELD

The technological field generally relates to pipe conveyors, and more particularly to steep angle pipe conveyor systems and vertical pipe conveyor systems.

BACKGROUND

One type of conveyor for transporting material is a pipe conveyor, which can be used to protect the material being transported by enclosing it. As such, pipe conveyors are often used in situations where spillage or dust may be an issue or where use of conventional conveyor systems may be too costly or hazardous due to environmental or population concerns. Pipe conveyers may be useful, for example, to convey bulk material between the phases of mining, processing, and storage.

Some pipe conveyors transport material in a circular cross-section formed by overlapping belt edges and using idlers arranged in a hexagonal pattern to form the tubular pipe-like shape. At the loading point, these systems provide a trough or flat conveyor for loading of the material. After loading the material, the belt is formed into a pipe shape for the transport length of the system and re-opened at the destination for the unloading of the material in the standard manner of a troughed or flat conveyor. Because the material is enclosed by the belt during transport, spillage, scattering, pollution, and flying dust may be reduced. These systems also may allow the pipe conveyor to maneuver both vertical and horizontal curves that may be difficult for conventional conveyors to pass through. Also, because pipe conveyors can load and discharge the bulk material in the conventional manner, standard equipment may be used at the head and tail ends.

Pipe conveyors are also useful in situations in which the conveyor layout requires horizontal and/or vertical curves, especially, when the conveyor layout includes a vertical rise or fall. Conventional pipe conveyors, however, are generally limited to being used in conveyor systems with vertical angles of less than 30 degrees as measured from a horizontal axis. While some pipe conveyor designs that allow for pipe conveyors to rise at vertical angles greater than 30 degrees, such systems were proposed more than a quarter of a century ago but have apparently not found successful commercial implementation.

In such conventional systems, the pipe forms a continuous tube. Lifting of the carried material appears to rely on a continuous carry/fall sequence that transports slugs of material for some distance up the tube by means of friction with the pipe walls until the slug collapses and the material falls back down the pipe to a higher level than where it began the previous carry/fall cycle. While prominent pipe conveyor vendors and materials-handling universities have demonstrated in experiments that such a transport mechanism can occur, it appears that difficulties with this approach have, at least to date, prevented such pipe conveyors from being offered for sale.

There are a number of significant difficulties or disadvantages inherent to such systems, which would be manifested if pipe conveyors operating on the continuous-tube principle could be commercialized. One weakness is that the efficiency of transport is likely to be highly dependent on the bulk flow properties of the carried load, which may vary continuously with some partially-processed materials. Another is that—under certain feed conditions—a long void could form below a filled length of pipe, where the filled length is temporarily supported by natural arching or bridging. Such a column of material—having been lifted to a significant height—could then break free, resulting in a sudden collapse of the material in the column, and causing the kind of catastrophic air-blast sometimes associated with hung-up ore passes in underground mines. Yet other limitations of such designs are that special procedures using loose flexible plugs are required to empty the conveyor, and that these designs have only been proposed for conveying in the upwards direction.

Another significant limitation of steep or vertical pipe conveyor systems is that the tensile capacity of the pipe belt increases only in direct proportion to the width of the belt. However, the weight of the material enclosed within the tube and supported by the tensile capacity of the pipe belt increases roughly in proportion to the square of the width of the belt. Therefore, as a designer of a steep or vertical pipe conveyor attempts to increase tonnage by increasing the effective diameter of the carrying tube, it may be found that the tensile capacity of the pipe belt quickly becomes the limiting constraint. Even when intermediate traction drives are provided, this adverse relationship may result in the intermediate drives having to be spaced much more closely than would otherwise have been necessary.

Another possible disadvantage of such steep or vertical pipe conveyor systems is that they may be prone to an unacceptable amount of leakage of carried material fines between the overlapping flaps of the pipe belt. Since the material in the tube is continuously displaced by the carry/fall transport mechanism, there is less opportunity for material to cake at and seal the junction between the overlapping pipe belt flaps.

In another type of steep or vertical pipe conveyor system, a tension element separate from the pipe belt, such as a chain or cable, carries a series of stiff diaphragms within the tube formed by the pipe belt. The diaphragms are configured to stand in planes perpendicular to the main axis of the tube, and to carry most of the weight of the material in steep sections of the pipe conveyor, and transfer the weight of that material to the tension element. The tension element in turn is supported by a drive means at a location beyond the conveyor discharge point. The purposes of such a configuration are apparently to lift discrete volumes of material carried by the discs, and to relieve the pipe belt of the tension-carrying role, so that the belt's primary role becomes that of enclosing the material. A major limitation of such a design is that, for dense materials or high lifts, the tension accrued by the tension element quickly rises to exceed its tensile capacity. Therefore the approach becomes impractical for the high lifts encountered in some applications such as mining. Another significant disadvantage of such systems is that the tension element is in direct contact with the load so that if the load is an abrasive and somewhat sticky material, such as a moist ore, a high rate of wear would occur on the tension element and on the means used to drive it, such as a sprocket in the case where the tension element is a chain. Yet another disadvantage of such an approach is that the rigid discs described are susceptible to damage by larger lumps of ore, as is the tension chain.

SUMMARY

One embodiment of a conveyor system may include a pipe conveyor with a head end, a tail end positioned at an elevation different than that of the head end, and an inclined or vertical section between the head end and the tail end. The conveyor system may also include a conveyor belt with a first portion and a second portion, the conveyor belt configured to form a pipe shape when the first and second portions of the conveyor belt are overlapped. The conveyor system may also include an auxiliary belt, referred to herein as a bridging belt, carried internal to the tube formed by the conveyor belt, and carrying throughout its endless length a series of flexible structures intruding across the section of the internal space formed by the conveyor belt. These flexible structures may be primarily configured to perform a centering function that promotes the bridging or self-arching behavior of a volume of material carried within the tube, thereby causing tangential frictional forces at the walls of the tube to be the primary means of support for the weight of the volume of material. The bridging belt may further be configured to carry the flexible structures only on an upper side of the bridging belt, and also to lie at the bottom of the troughed conveyor belt as the two belts progress towards a material-loading zone of the conveyor system. The conveyor system may further be configured to briefly route the bridging belt on a path displaced away from the conveyor belt beyond the discharge pulley of the conveyor belt, so as to allow for belt-cleaning of the conveyor belt.

Another embodiment of a conveyor system may include a pipe conveyor with a head end, a tail end positioned at an elevation different than that of the head end, and an inclined or vertical section between the head end and the tail end. The conveyor system may also include a conveyor belt with a first portion and a second portion. The conveyor belt may form a pipe shape when the first and second portions of the conveyor belt are overlapped. The conveyor system may also include a series of flexible structures attached to the inner wall of the conveyor belt and intruding across the section of the internal space formed by the conveyor belt. These flexible structures may be primarily configured to perform a centering function that promotes the bridging or self-arching behavior of a volume of material carried within the tube, thereby causing tangential frictional forces at the walls of the tube to be the primary means of support for the weight of the volume of material.

Another embodiment of a conveyor system may include a pipe conveyor with a head end, a tail end positioned at an elevation different than that of the head end, and an inclined or vertical section between the head end and the tail end. The conveyor system may also include a conveyor belt with a first portion and a second portion. The conveyor belt configured may form a pipe shape when the first and second portions of the conveyor belt are overlapped. The conveyor system may also include one or more narrow elongate longitudinal connectors (such as a rope, wire rope, chain, or conveyor belt) carried internal to the tube formed by the conveyor belt. These elongate connectors may support throughout the endless length of the elongate connector a series of flexible centering structures intruding across the section of the internal space formed by the conveyor belt. These flexible centering structures may be primarily configured to perform a centering function that promotes the bridging or self-arching behavior of a volume of material carried within the tube, thereby causing tangential frictional forces at the walls of the tube to be the primary means of support for the weight of the volume of material. The elongate connectors may further be configured to carry the centering structures centered about the long axes of the elongate connectors. The conveyor system may further be configured to briefly route the elongate connectors on a path displaced away from the conveyor belt beyond the discharge pulley of the conveyor belt, so as to allow for belt-cleaning of the conveyor belt.

Another embodiment of a conveyor system may include any of the conveyor systems described above, but further including a number of intermediate friction drives installed along the course of the inclined portion of the conveyor. The intermediate friction drives may engage external surfaces of the pipe conveyor belt. In such embodiments, the stably-resting material contained within the discrete cells formed by the flexible centering structures may provide more resistance to lateral compression of the conveyor pipe than is available in the case of continuous-tube pipe conveyors where the carried material is continuously falling back to some degree. Therefore the intermediate friction drives may be take advantage of this increased resistance to lateral compression of the pipe walls by allowing an increased biasing force and power input from the intermediate friction drives.

Another embodiment of a conveyor system may include any of the conveyor systems described above, where the material to be transported is of a sufficiently fine granular size distribution as to eliminate any concern of large lumps of material being trapped between the centering structures and a closing pipe belt, so that the centering structures may be of a relatively rigid construction when compared to the stiffness of the pipe conveyor belt.

Another embodiment of a conveyor system may include any of the conveyor systems described above, where a feeding device at the loading zone is configured to feed the material to be transported at a rate that only fractionally fills the carrying segments defined by the centering structures, providing for a lower transported weight per unit lift of pipe belt, and therefore allowing for greater lift heights between pipe belt drives.

Another embodiment of a conveyor system may include a pipe conveyor. The pipe conveyor may include a head end, a tail end positioned at an elevation different from the head end, an inclined section between the head end and the tail end, and a conveyor belt. The conveyor belt may include a first portion and a second portion. The conveyor belt may form a pipe shape when the first and second portions of the conveyor belt are overlapped. The pipe shape may extend from a pipe closing point to a pipe opening point and may enclose two or more longitudinally spaced-apart centering structures. At least one of the two or more longitudinally spaced-apart centering structures may enable self-bridging of a bulk material carried in a pipe volume above the at least one of the two or more longitudinally spaced-apart centering structures. The self-bridging of said bulk material causes a weight of said bulk material to be primarily supported by interaction of said bulk material with walls of the pipe shape.

In some implementations, the at least one of the at least one of the two or more longitudinally spaced-apart centering structures is sufficiently flexible to conform to the pipe shape when a lump of bulk material is pinched between the at least one of the two or more longitudinally spaced-apart centering structures and the conveyor belt.

In some embodiments, the two or more longitudinally spaced-apart centering structures are carried on at least one endless elongate connector (such as a rope, wire rope, chain, or conveyor belt) not joined to the conveyor belt. The at least one endless elongate connector may include at least one bridging belt that carries the two or more longitudinally spaced-apart centering structures on one face of the at least one bridging belt. An opposing face of the at least one bridging belts may rest against a carry-side medial surface of the conveyor belt.

In some implementations, the at least one of the two or more longitudinally spaced-apart centering structures may include mounting flanges. In such implementations, the mounting flanges and the at least one bridging belt may be narrow relative to a circumference of the pipe shape. Further, the at least one of the two or more longitudinally spaced-apart centering structures may include first and second substantially circular portions joined at a common apex by a narrow connecting portion.

In some embodiments, the at least one endless elongate connector may include a wire rope. In such embodiments, the two or more longitudinally spaced-apart centering structures may include two or more spherical centering structures in which the wire rope passes through diametrical axes of the two or more spherical centering structures. The conveyor system may further include at least one guide wheel having peripheral recesses that are sized to accept at least one of the two or more spherical centering structures as the at least one of the two or more spherical centering structures passes the at least one guide wheel.

In some embodiments, at least one bend pulley situated beyond a discharge pulley of the conveyor system may guide the at least one endless elongate connector on a path displaced away from a path of the conveyor belt.

In some implementations, the at least one of the two or more longitudinally spaced-apart centering structures may attach to the at least one endless elongate connector in such a way as to dispose the at least one centering structure substantially symmetrically about the at least one endless elongate connector.

In some embodiments, each of the two or more longitudinally spaced-apart centering structures may be directly attached to a carry-side medial surface of the conveyor belt. In some of these embodiments, at least one of the two or more longitudinally spaced-apart centering structures may be adhered to the carry-side medial surface of the conveyor belt.

In some embodiments, the conveyor system may include at least one intermediate friction drive at an inclined portion of the pipe conveyor. The least one intermediate friction drive may engage external surfaces of the conveyor belt.

In some implementations, the two or more longitudinally spaced-apart centering structures may be closely spaced and configured to stiffen opposing walls of the pipe belt against a biasing applied by traction components of the at least one intermediate friction drive.

In some embodiments, the two or more longitudinally spaced-apart centering structures may include an arch shaped centering structure.

In some implementations, the at least one intermediate friction drive may include a friction drive tire and/or the at least one intermediate friction drive may include traction drives biased against opposing flattened walls of the conveyer belt with the two or more longitudinally spaced-apart centering structures spanning between the flattened walls.

In some embodiments, at least one of the two or more longitudinally spaced-apart centering structures may include one or more footings integrally molded with a cylinder.

In some embodiments, the conveyor system may include a feeding device that feeds the bulk material at a rate that only fractionally fills two or more carrying segments defined by the two or more longitudinally spaced-apart centering structures.

DETAILED DESCRIPTION

Described herein are vertical and steep angle pipe conveyor systems that may be used to transport materials from one location to another location. Pipe conveyor systems may be suited for use in, for example, mines that include steep or vertical angles that are greater than the surcharge angle of the carried material. These pipe conveyors may include a conveyor belt that is formed into a pipe-like shape to define a space that contains the material to be transported by the conveyor. These pipe conveyors may also include structures within the pipe-like shape configured to enable bridging of the carried material and to provide for dividing a continuous pipe space into a longitudinal sequence of substantially discrete cells.

Bridging properties of a bulk material are well known to designers of bulk materials equipment, such as silos, hoppers, chutes, feeding devices, and the like. However, whereas the bridging is usually perceived as a problem to be avoided in the design and operation of such equipment, the property may be advantageously utilized to enable a new mode of material transportation in steep or vertical pipe conveyor systems.

Figure 1:
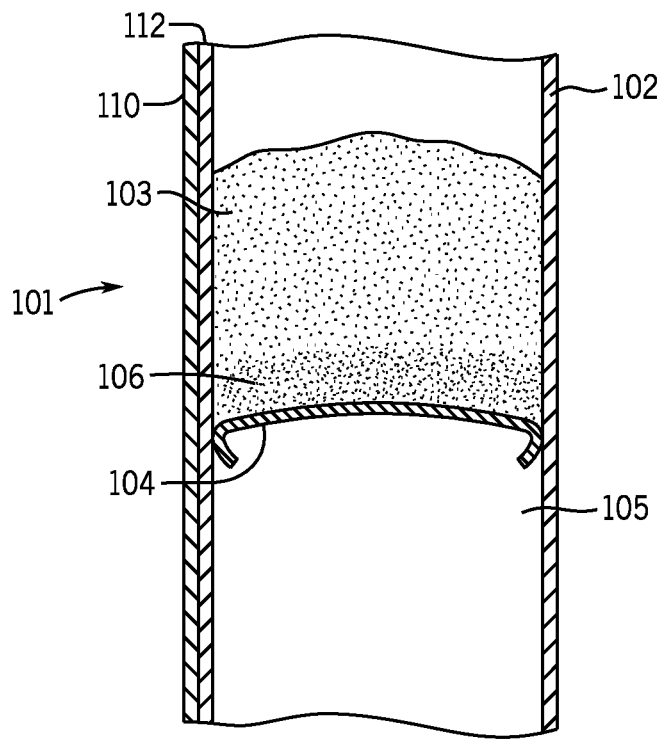
FIG. 1 shows a vertical section of a vertical pipe conveyor loaded with bulk materials.

FIG. 1 is a schematic elevation view of a longitudinal section of a pipe conveyor where a conveyor belt 102 has been formed into a vertical tube or other pipe shape 101 by overlapping a first portion 110 and a second portion 112 of the conveyor belt 102. A volume of bulk material 103 carried by the pipe conveyor system is contained within the vertical tube 101. The volume of bulk material may be situated above a partial void 105 and separated from the partial void by a centering structure 104 that at least partially spans between the walls formed by the enclosing belt 102. The centering structure 104 may be highly flexible, having far less stiffness than is required to support the weight of the portion of bulk material 103 carried above the centering structure 104. However, it is a property of many bulk materials that they tend to display bridging behavior to at least some degree. The centering structure 104 serves to support an arch or bridge of material 106 that spans between the walls of the tube. The arch of material 106 may carry a load in the manner of conventional structural arches, transferring most of the weight of the volume of bulk material 103 directly into the walls of the tube. This material arching continues throughout the column of material so long as the height of the column is large relative to its diameter.

Even if the centering structure only partially or irregularly spans across the diameter of the tube, it may still serve the function of substantially supporting the bridging of the bulk material. This latter is true even if the centering structure is substantially distorted or displaced when the pipe belt is folded into a closed tube. In some of the embodiments that follow, the principle of the centering structure 104 is embodied in centering structures of differing forms. It is possible to utilize the principle described above in a very great range of shapes and configurations of centering structures adapted to the purpose of promoting bridging within a steep or vertical pipe conveyor tube.

The principle of the centering structure 104 may be usefully applied to conveyor pipes of round, oval, rounded rectangular and other cross-sectional forms. The segmentation of the load provided by centering structures may be useful for pipe conveyors rising or falling at angles greater than the surcharge angle of the bulk material. The centering structure principle may be embodied equally successfully in pipe conveyors that are raising material or lowering material.

Figure 2A:
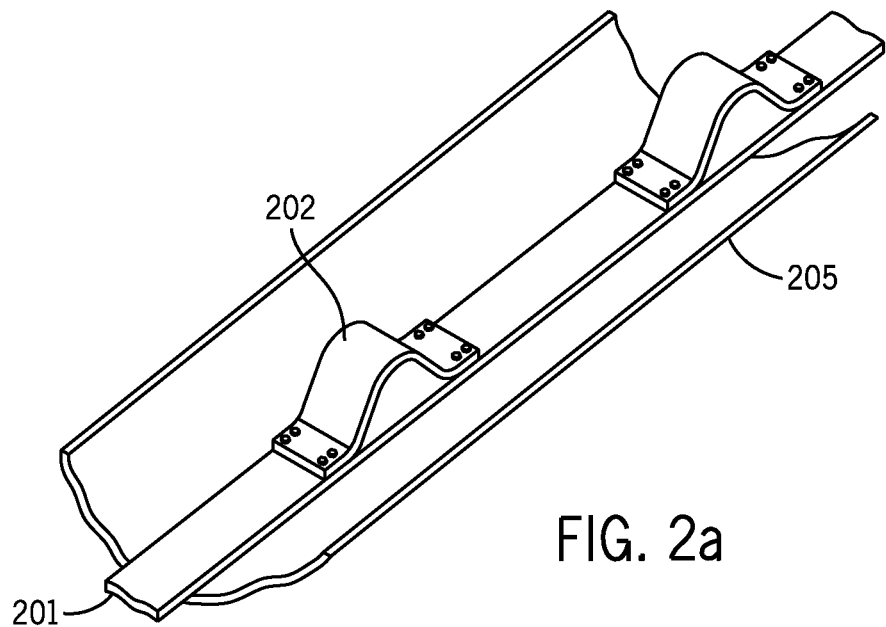
FIG. 2a shows a partial perspective view of an open trough of a pipe conveyor belt upstream of the material loading zone of a pipe conveyor system, with a bridging belt carrying centering arches and laid on the bottom of the pipe belt.

FIG. 2a shows the open trough of a pipe conveyor belt 205 downstream of the material loading zone of a pipe conveyor system. An endless elongate connector, such as a bridging belt 201, carrying centering arches 202 is positioned on the bottom of the pipe belt trough. The pipe conveyor belt 205 is ready to receive the bulk material loaded into the trough of the pipe conveyor belt 205 from above.

One function of the bridging belt 201 is to carry a continuous series of centering structures spaced from each other at a predetermined distance on a circuit that may run mostly within the pipe conveyor belt. Another function of the bridging belt is to carry the series of centering structures into the loading zone within the trough of the pipe conveyor belt and to stably position the series of centering arches prior to coverage of the centering arches by loaded material.

The predetermined spacing between the centering structures may be selected to optimize the level of horizontal pressure developed at the base of each segment or cell, and to limit the amount of slide-back as the bulk material is drawn through the first vertical curve that connects the horizontal portion of the pipe conveyor to the steep or vertical portion. Another spacing consideration is to place the centering structures sufficiently close together so that even if a particular centering structure is torn off or does not produce the desired bridging, the adjacent centering structure is close enough to allow it to function in the desired manner. In some embodiments, these considerations may lead to a spacing of the centering structures that is perhaps two to ten times the largest diametral dimension of the pipe belt.

An advantage of using a narrow rubberized belt—such as is used in conveyor belting—to act as an elongate endless connector between the centering structures is that the bridging belt 201 can be formulated to absorb a good portion of the wear imparted by the material being loaded into the trough of the pipe belt at the loading zone. Furthermore, because such a bridging belt can be of low strength and does not require the type of specialized transverse stiffness called for in a pipe belt, the bridging belt can be a low-cost belt.

Figure 2B:
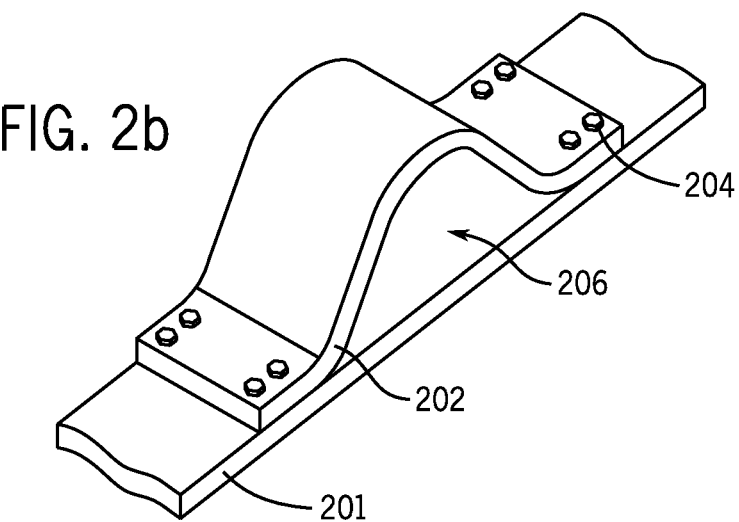
FIG. 2b shows a perspective view of a centering structure in the form of flexible arch carried on a bridging belt.

FIG. 2b shows a centering structure 202 in the form of a flexible arch carried on the bridging belt 201. The centering structure 202 may be configured from a length of stiff yet flexible material, such as conveyor belting whose carcass is either fabric or steel cord. The centering structure may further be configured to have sufficient stiffness to roughly maintain its form when material of a predetermined typical density and size distribution is loaded from above the centering structure and into the trough of the pipe conveyor.

The centering structure 202 may be attached to the bridging belt 201 by mechanical fasteners 204 or by other suitable attachment means, such as vulcanization or adhesion. In this embodiment of the centering structure 202, a space 206 defined between the centering structure and the bridging belt 201 may diminish the likelihood that a lump of loaded material is pinched between the pipe conveyor belt and the centering structure 202 when the pipe conveyor belt is being formed from a trough into a pipe.

The centering structure may further be configured with sufficient flexibility so that the centering structure deforms instead of any significant deformation being imposed on the wall of the pipe conveyor belt if a lump of material becomes pinched between the pipe conveyor belt and the centering structure when the pipe conveyor belt is formed from a trough into a pipe.

In some embodiments, the centering structure 202 and its attachment to the bridging belt may be configured in such a way that the combination has sufficient flexibility to pass around pulleys or guide wheels without being subjected to excess strain.

Figure 2C:
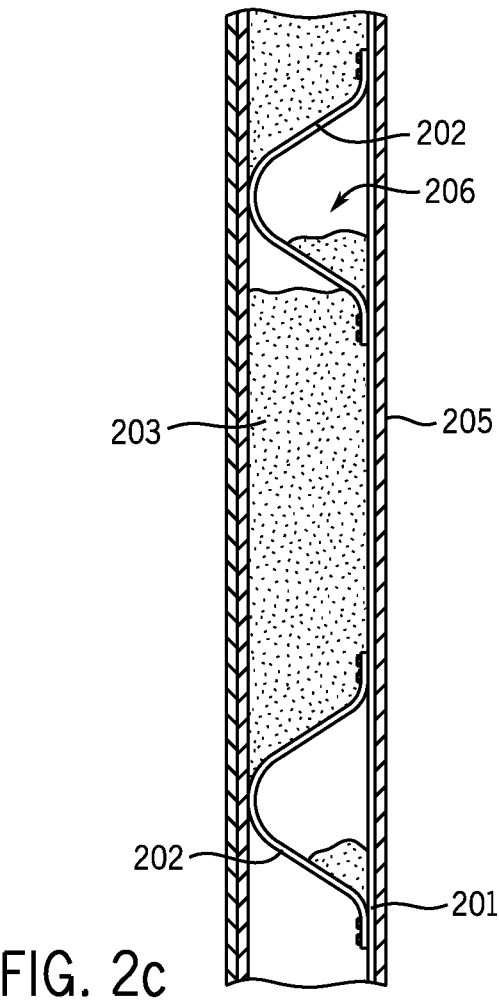
FIG. 2c shows a longitudinal section of a length of the pipe conveyor belt, with flexible arches supporting the bulk material in a series of discrete cells.

FIG. 2c shows in elevation a partial longitudinal section of a length of vertical pipe conveyor, with flexible centering arches 202 supporting the bulk material 203 in a series of discrete cells. The centering arches 202 may be configured to at least span the dimension between two opposing walls of the pipe tube formed by the pipe belt 205. Spaces 206 within the arches 202 may be partially filled with material 203 during the loading of the conveyor, or in the course of the pipe's progress. Material 203 held in the segment defined by adjacent arches may partially fill the space so defined. In examples where the designer's intent is to reduce the weight of carried material relative to the available longitudinal tensile strength of the pipe belt, a load feeder may be used to limit the level of fill of each segment.

In some examples, the bridging belt 201 may be constructed from a fabric conveyor belt or a steel cord conveyor belt of relatively low strength compared to that of the pipe conveyor belt. In those examples, the bridging belt may be configured to be supported against gravity within the pipe conveyor belt 205 by the friction developed between the bridging belt and the pipe conveyor belt under the internal outward pressure exerted by the column of material 203 within the pipe belt. In some examples, the bridging belt 201 may be configured to have at least sufficient longitudinal strength to support its own weight as well as that of the attached centering structures 202 over the greatest freely suspended height that the bridging belt encounters within the conveying system.

In other embodiments, the centering structures 202 may be configured to be at least partially compressed by the enclosing pipe belt 205 so that there is sufficient frictional grip between the pipe belt and the centering structures to support the combined weight of the bridging belt 201 and the centering structures. In such embodiments the longitudinal strength of the bridging belt 201 may be reduced.

Figure 2D:
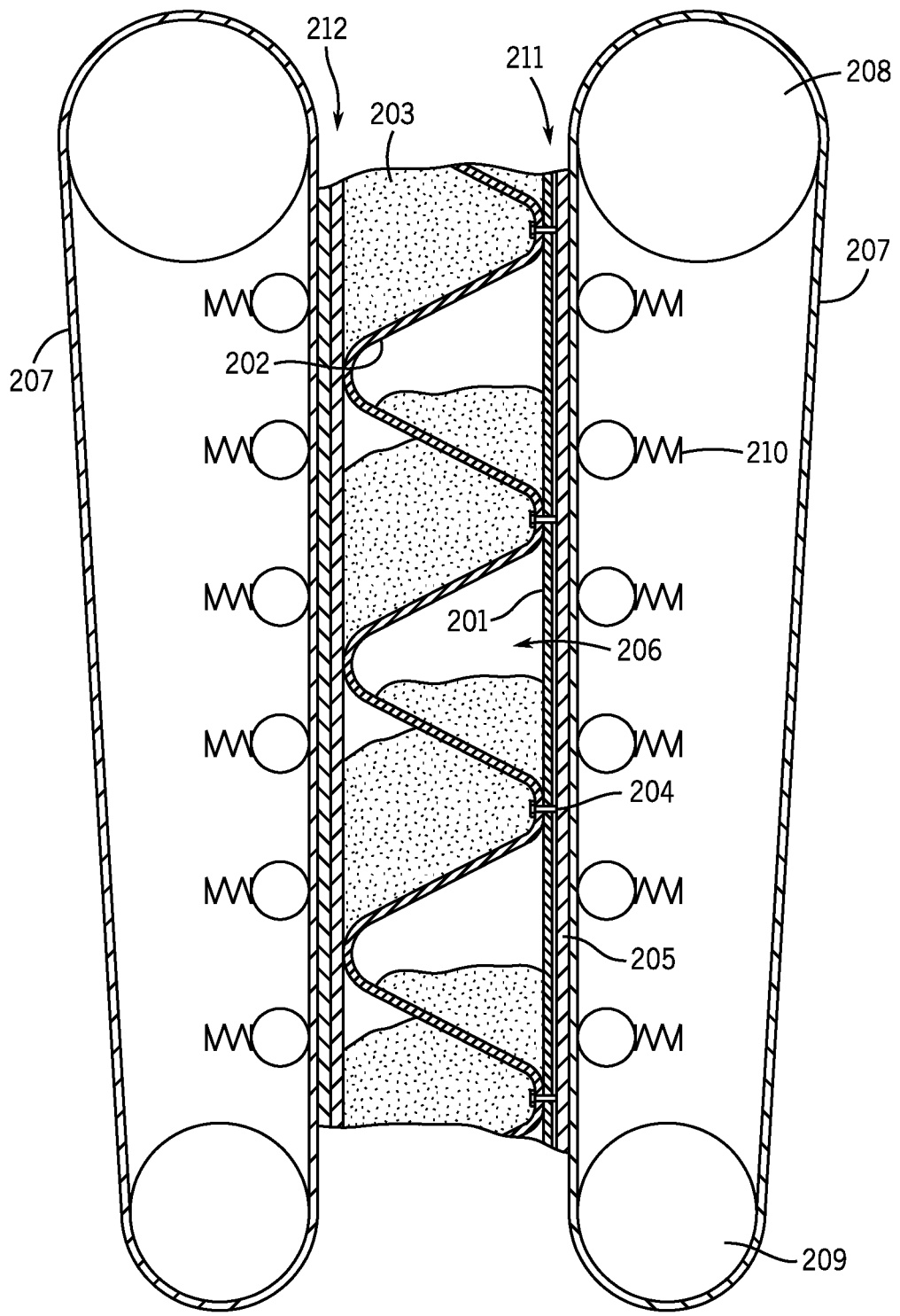
FIG. 2d shows in elevation a longitudinal section of a length of the pipe conveyor belt, with centering arches configured to allow higher amounts of traction to be applied via intermediate traction drives.

FIG. 2d shows in elevation a longitudinal section of a length of vertical pipe conveyor, with centering structures 202 configured to allow higher amounts of traction to be applied via intermediate friction drives, such as traction drives. In such an embodiment, a designer's concern may be to stiffen the pipe tube against lateral pressure applied by an intermediate traction drive. Traction drives rely on tangential friction between the driving and the driven surfaces, so if higher inward force can be applied to the conveyor pipe without undue deformation of the pipe shape, then a greater amount of traction can be applied via friction at each intermediate drive. A difficulty for vertical pipe conveyors is that for the proportions found in most pipe conveyors, the silo effect prevents the bulk material from developing wall pressures of more than about one half of a pound per square inch. This low level of internal pressure provides insufficient lateral resistance to allow the intensity of tractive force yield that a designer might desire. By spacing the centering structures 202 at a close pitch and selecting an appropriate shape (e.g., an arch shape) and bending stiffness of the material forming the centering structure, the centering structures 202 support the facing walls against lateral compression, and a substantial increase may be obtained for the permissible normal traction forces pressing inward on the pipe walls. An appropriate bending stiffness for the centering structures 202 may allow sufficient flexibility that arch structures for the centering structures 202 could still deflect away from the pipe wall if a lump of material became pinched between the wall and the arch, rather than the pipe wall developing a protrusion.

Still with reference to FIG. 2d, in a preferred embodiment the pipe belt 205 takes the form of a rounded rectangular section, with the traction drives biased against opposing flattened walls of the tube 211, 212, and the centering structures 202 spanning between these two walls. In this embodiment, the centering structures 202 may be formed from planar material such as conveyor belting attached by fasteners 204 to a bridging belt 201 so as to provide an endless series of sinusoid-shaped arches. Transported bulk material 203 may be carried primarily on the open side of the centering structures 202, but also to some extent within any open spaces 206 such as those left on the "closed" side of centering structures 202. To better distribute the normal traction forces, a pair of opposed traction belts 207 (providing wider load distribution than the traction tires shown in FIG. 9a) driven by intermediate drive pulleys 208, tensioned by tail pulleys 209, and biased against the flattened-from pipe belt by two or more pressing rollers 210 may be desirable, where the pressing length of the traction belts may preferably be a non-integer multiple of the centering pitch of the centering structures 202. Another advantage of such a centering configuration is that it may help to stabilize the form of the belt tube and transfer traction shear forces from the more shear-flexible overlapped walls 212 to the stiffer simple medial wall 211 of the belt tube.

Figure 3A:
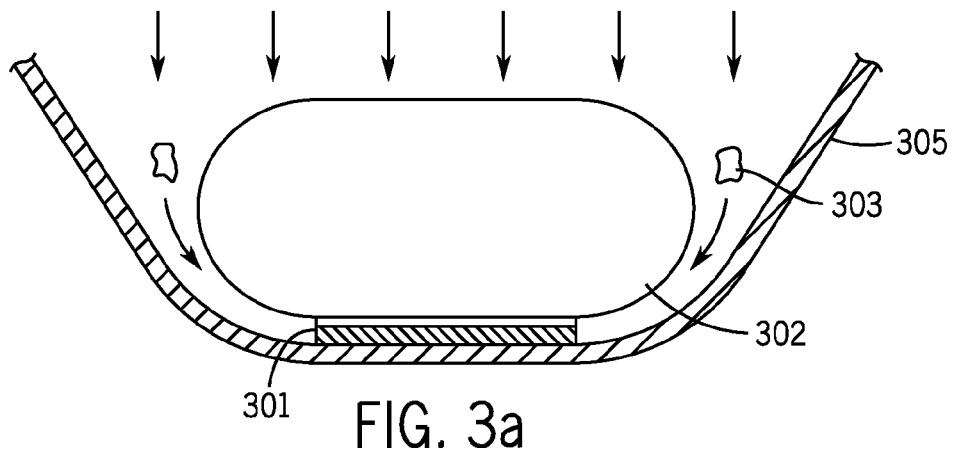
FIG. 3a shows a transverse section of a pipe conveyor belt in a material loading zone, illustrating how an open arch provides a route for lumpy material to avoid being pinched by the enclosing walls of the pipe belt.

FIG. 3a shows a transverse section of a pipe conveyor belt 305 in a material loading zone. This figure illustrates how an open arch 302 may provide a route for lumpy material 303 to avoid being pinched by the enclosing walls of the pipe belt.

Figure 3B:
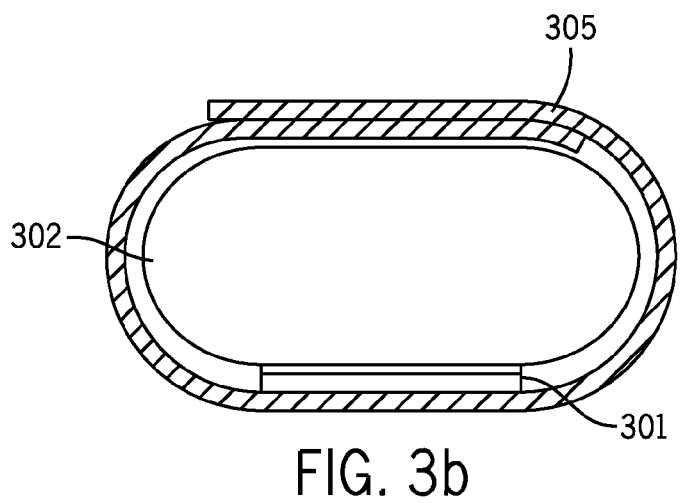
FIG. 3b shows a transverse section of pipe conveyor where the pipe belt forms a rounded rectangle about an enclosed centering structure.

FIG. 3b shows a transverse section of pipe conveyor where the pipe belt 305 forms a rounded rectangle about an enclosed centering structure 302.

Figure 3C:
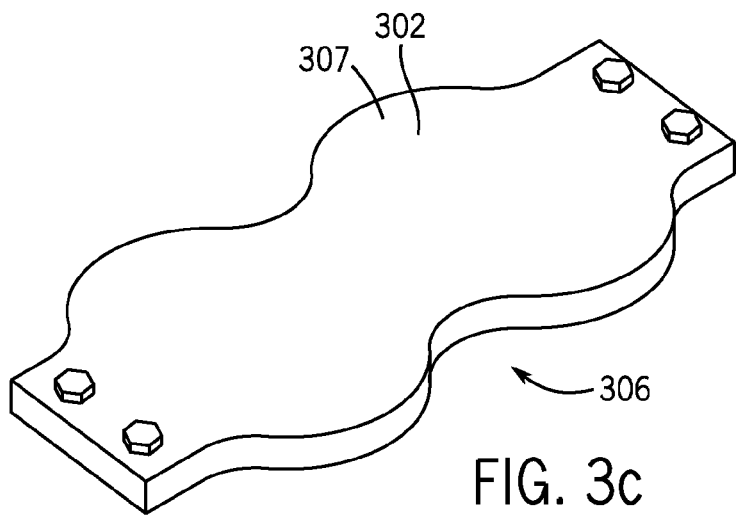
FIG. 3c shows a perspective view of a pattern for flat material that is formed into a centering structure.

FIG. 3c shows a perspective view of a pattern for a flat material 306 that is formed into a centering structure, in this case a centering arch, configured to fit in a pipe conveyor whose transverse section is a rounded rectangle. To provide for smaller gaps between the sides of the centering arch and the pipe wall, the pattern may include lobes 307 configured to match the rounded sides of the pipe belt.

Figure 4:
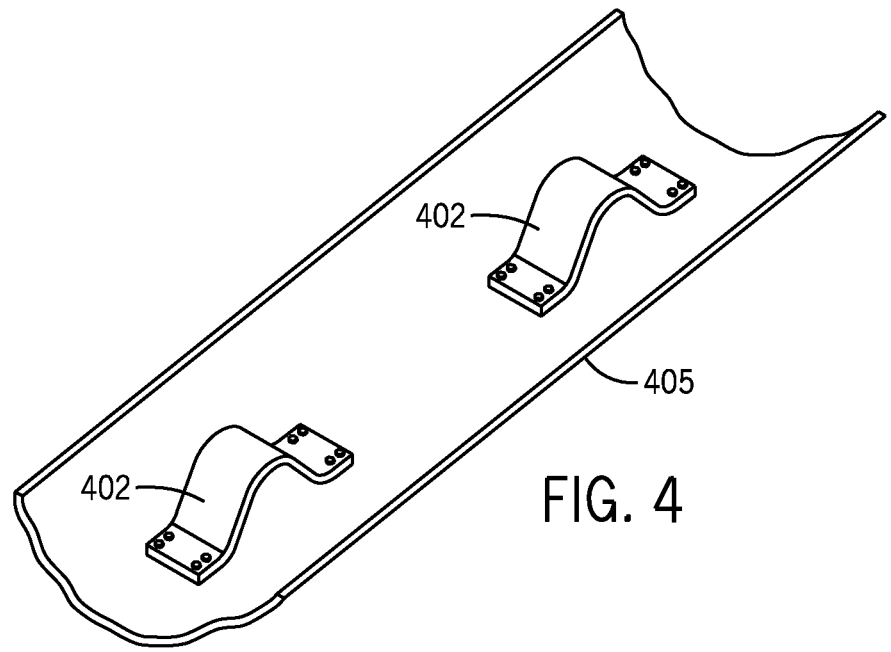
FIG. 4 shows a perspective view of a portion of a pipe conveyor belt with centering structures attached directly to the medial portion of the pipe conveyor belt.

FIG. 4 shows a length of the open trough of a pipe conveyor belt 405, where the centering structures 402, such as centering arches, are attached directly to the carry-side medial portion of the pipe conveyor belt itself. Such an embodiment may be desirable in examples where the material to be transported by the pipe conveyor is of a relatively fine and uniform consistency, and is also not too sticky. Appropriate uses may also include examples where cleaning of the carry surface of the pipe belt can be omitted. Typical applications for such an embodiment may include ship loaders and un-loaders or conveyors for charging silos and bins with semi-finished raw product. Other appropriate uses would include applications where there are no significant maintenance-related concerns about fixations to the pipe conveyor belt itself.

Figure 5A:
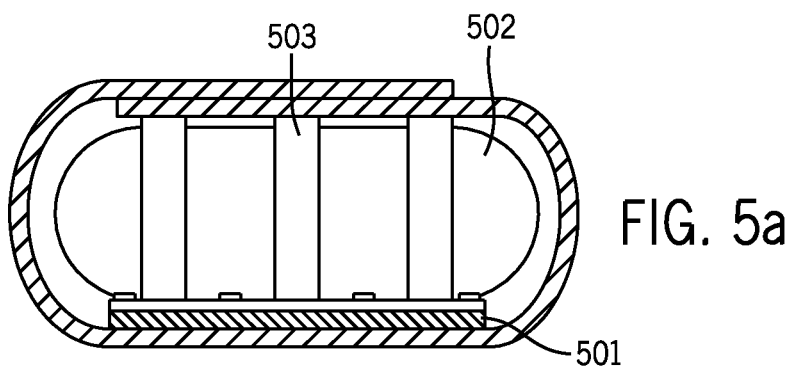
FIG. 5a shows another embodiment of a centering structure for a pipe conveyor of a rounded rectangular transverse section, where the centering structure takes the form of a fully-closed domed cylinder.

FIG. 5a shows another embodiment of a centering structure for a pipe conveyor of a rounded rectangular transverse section, where the centering structure 502 takes the form of a fully-closed domed cylinder supported by a base 503. The stiffness of the cylinder may derive from the bending stiffness of the walls, or the cylinder may be filled with a compressible elastic material. An advantage of such a centering structure is that there is no opening or void where material can collect and would later need to be shaken out over the conveyor system's discharge chute.

Figure 5B:
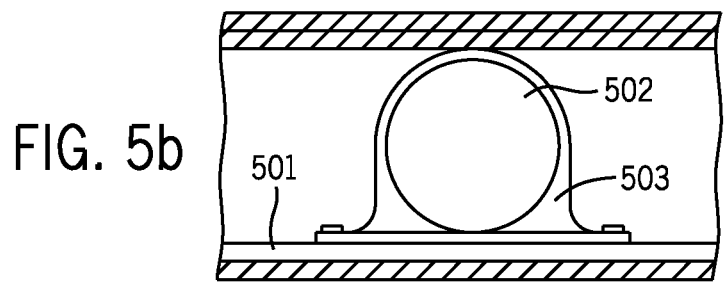
FIG. 5b shows a lateral view of the centering structure illustrated in FIG. 5b.

FIG. 5b shows a partial longitudinal section of a lateral elevation of the centering structure 502 illustrated in FIG. 5b. The centering structure 502 may be attached to a bridging belt 501 and enclosed in a pipe belt. The base 503 of the centering structure 502 may take the form of one or more footings integrally molded with the cylinder.

Figure 6A:
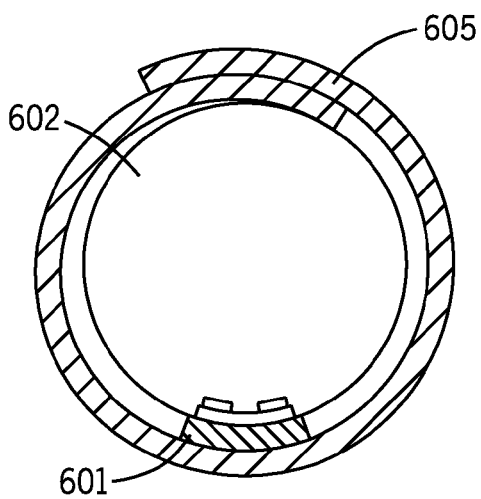
FIG. 6a shows a transverse sectional view of a centering structure positioned in a pipe conveyor which has a traditional circular transverse section.

FIG. 6a shows a transverse sectional view of a centering structure 602 positioned in a pipe belt 605 that has a traditional circular transverse section.

Figure 6B:
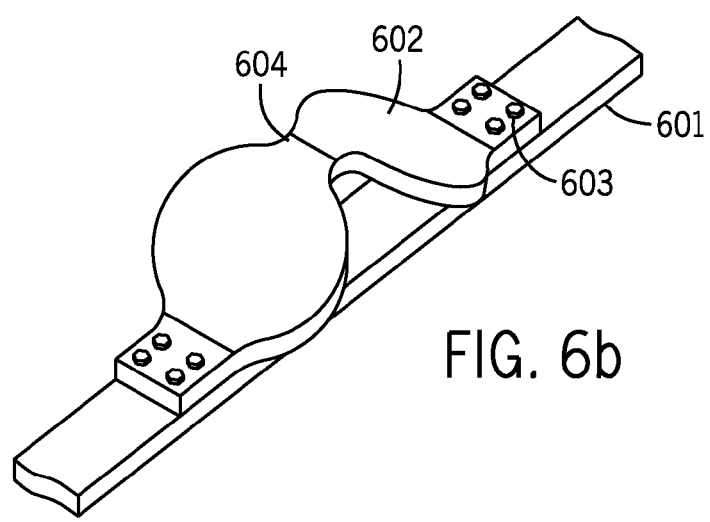
FIG. 6b shows a perspective view of the centering structure of FIG. 6a, embodied in the form of flexible arch carried on a bridging belt that is narrow relative to the circumference of the pipe tube.

FIG. 6b shows a perspective view of the centering structure 602 of FIG. 6a. The centering structure 602 may be a flexible arch carried on a bridging belt that is narrow relative to the circumference of the pipe tube. In order for the centering structure 602 and the bridging belt 601 to both rest stably on the bottom of the trough of the pipe belt before the loading area and to conform to the circular shape of the pipe belt, the mounting flanges 603 of the centering structure 602 and the bridging belt 601 may both be narrow relative to the circumference of the pipe form. First and second substantially circular portions of the centering structure 602 may be joined at a common apex by a narrow connecting portion 604.

Figure 6C:
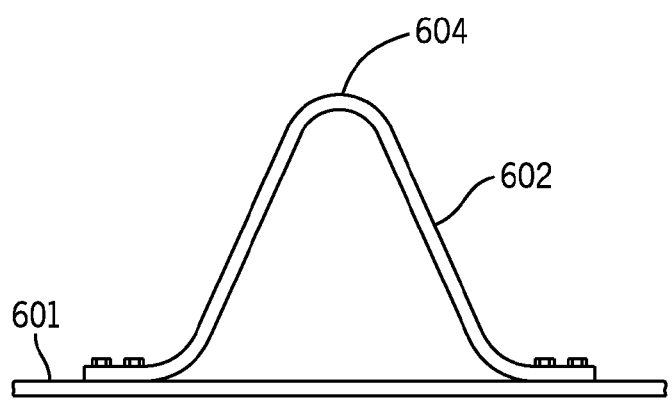
FIG. 6c shows a lateral elevation of the centering structure of FIG. 6b mounted on the bridging belt.

FIG. 6c shows a lateral elevation of the centering structure 602 of FIG. 6b mounted on the bridging belt 601. In this view, the centering structure 602 may have a triangular profile as shown, or else an arched profile. In the case of an arched profile, the first and second disc-like portions of the centering structure 602 may be more elliptical in form.

Figure 7:
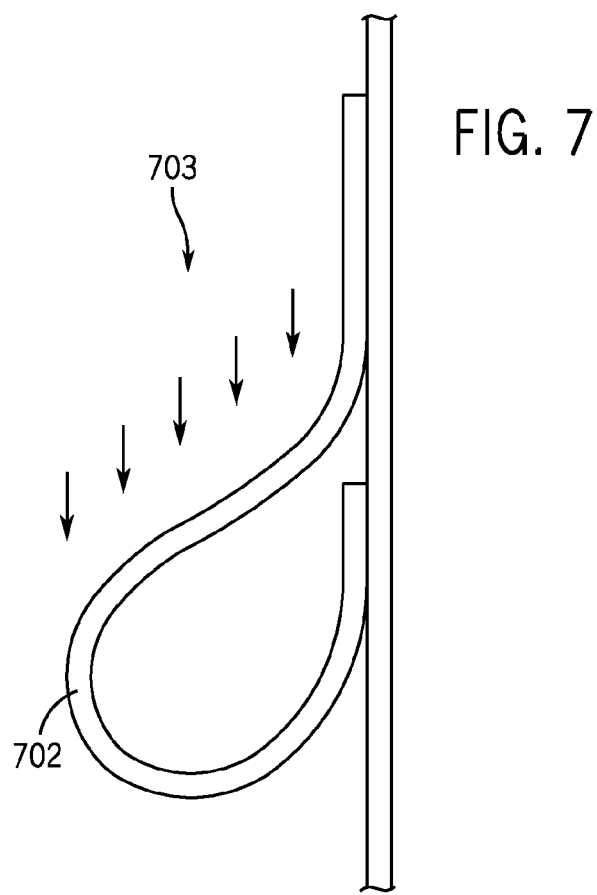
FIG. 7 shows a lateral elevation of a centering structure configured for attachment by adhesion to the bridging belt.

FIG. 7 shows a lateral elevation of a centering structure 702 configured for attachment by adhesion to a bridging belt 701. The arrows indicate the slight downward load that the carried material may exert on the centering structure 702. For this direction of loading, there are no significant prying forces that tend to open the adhered joints. Such a configuration may be desirable where a designer wishes to avoid mechanical fasteners that penetrate the bridging belt 701. In some examples, the same form of centering structure 702 may be attached by adhesion directly to the carry-side medial portion of the pipe belt itself.

Figure 8:
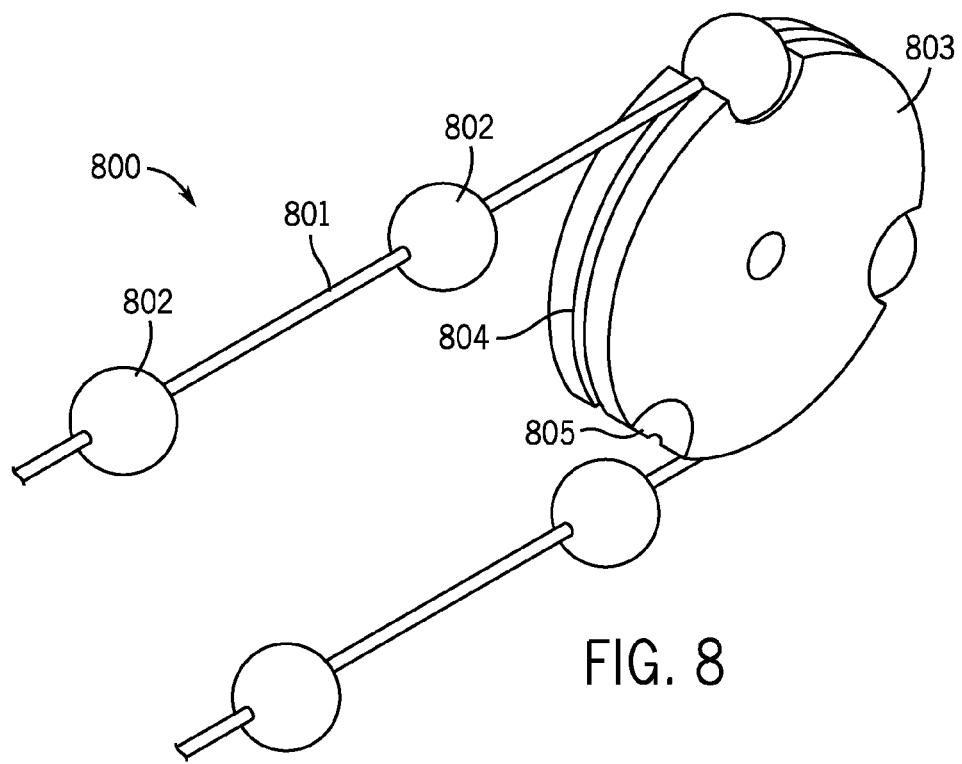
FIG. 8 illustrates an embodiment where the centering structures are centrally rather than laterally attached to the longitudinal connectors.

FIG. 8 illustrates an embodiment where the centering structures are centrally rather than laterally attached to the longitudinal connectors. A series of spherical centering structures 802 is connected by a wire rope 801 passing through diametral axes of the spherical centering structures 802, like beads on a string. Spherical centering structures 802 may be most suitable for a pipe conveyor that has a circular cross-section. The centering structures 802 may be configured to be flexible and compressible relative to the stiffness of the pipe belt walls. Many variations of this embodiment are possible, including having more than one connection between each pair of centering structures and substituting ropes, chain or other elongate members in place of wire rope. In many examples, the centering structures are mounted on the longitudinal connectors so that the centering structures are mounted substantially symmetrically with respect to the longitudinal connectors. Also, the centering structures 802 may be configured to have any form and attachment point to the elongate members that facilitates consistent positioning of the centering structures 802 in manner that results in the centering structures 802 spanning across the pipe section.

At points along the conveyor system where the assembled string 800 is not guided by virtue of its enclosure within the formed pipe, the string may be guided by one or more guide wheels 803. Such guide wheels 803 may be configured to have a first set of grooved peripheral surfaces 804 for accepting the elongate portion of the assembled string, as well as a second set of peripheral surfaces or recesses 805 configured to accept the passing centering structures. The circumferential pitch of these recesses may match the linear pitch of the centering structures on the cable. In some embodiments, the guide wheel 803 may be driven only by the passage of the assembled string.

Figure 9A:
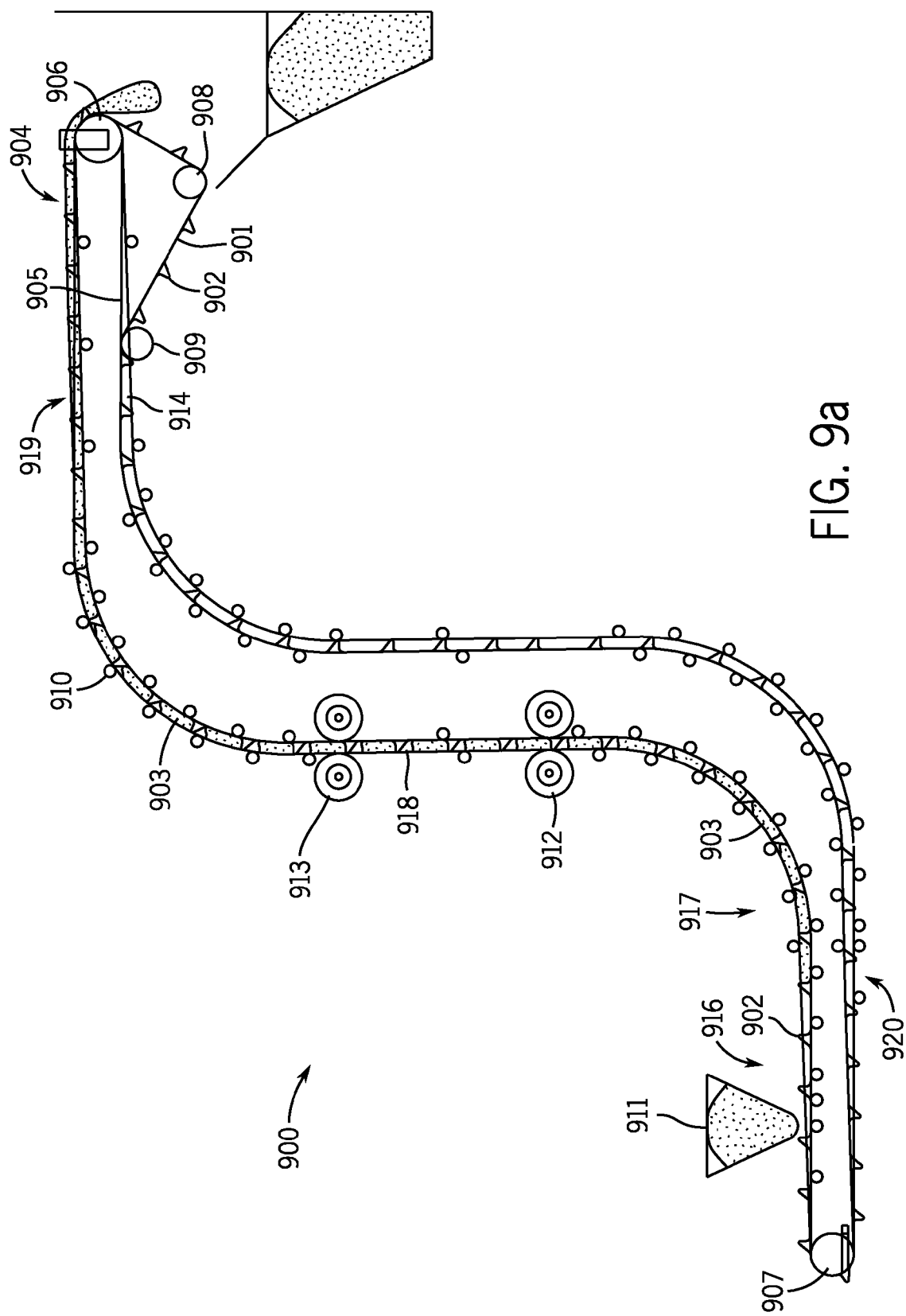
FIG. 9a illustrates implementation of the centering structure and bridging belt principle in a vertical pipe conveyor system.

FIG. 9a illustrates implementation of the centering structure and bridging belt principle in a vertical pipe conveyor system. In FIG. 9a, features of a vertical pipe conveyor system 900 are omitted in order to highlight the centering structure feature. However, omitted conventional features, such as a supporting structure, would be known to those skilled in the art. The vertical pipe conveyor system may have a tail end with a tail pulley 907 at a tail area of the conveyor, and a head pulley 906 at an elevation higher than the tail pulley. Material metered from a feeding device 911 may be loaded at a loading zone 916, and may be conveyed along the path of the pipe conveyor to be discharged at the head area 904.

A pipe belt 905 may transition from a flat profile at the exit from the tail pulley 907, through a troughed profile in the loading zone 916 and into a pipe profile at the end of the transition zone 917. At the pipe closing point or zone, the pipe profile may be achieved by guiding first and second lateral parts of the pipe belt to partially fold over each other in the manner known for pipe belts. In some embodiments the cross-sectional shape of the pipe may be a rounded rectangular form.

A continuous, longitudinally spaced-apart series of centering structures 902 may be attached to and carried by a bridging belt 901. The centering structures 902 and the bridging belt 901 may take a range of forms as described elsewhere in this specification. The centering structures 902 are configured to enable the natural bridging behavior of the carried bulk material at steep or vertical portions of the pipe conveyor.

The bridging belt 901 may run external to the pipe conveyor belt and in contact with the carry side of the pipe conveyor belt when traversing the tail pulley 907, so that the bridging belt lies flat on the bottom of the conveyor trough in the loading zone 916 and the centering structures 902 protrude upwards into the volume of the pipe trough. In the loading zone, the feeding device 911 may meter the material into the belt trough and over the centering structures 902 so that the belt trough is filled to the desired degree. Downstream of the loading zone 916, the lateral portions of the pipe belt may be folded over to form a pipe or tube enclosing the series of centering structures 902. The centering structures 902 now divide the stream of carried material 903 into discrete segments or cells to some significant degree.

The conveyor belt may be formed into a pipe and guided by conventional pipe belt idler sets 910 through those parts of the pipe conveyor system where the conveyor belt runs as a pipe. In steep and vertical parts of the pipe conveyor route, the centering structures 902 sustain bridging of the bulk material so that the material may traverse from one level to another in substantially stable segments or cells. Although some material may trickle through from a higher segment to a lower segment, this negligible backward flow does not significantly detract from the substantially stable nature of the material transport from one elevation to another.

An advantage of the segmented mode of material transfer is that a predetermined amount of space 918 may remain within a loaded pipe belt by virtue of the metered loading and also due to spaces within the centering structures 902. This space may prevent dense packing of the material and facilitate more flexible traverses by the loaded pipe belt through vertical curves and between guidance means such as idler rings.

At a pipe-opening point or zone 919, the pipe belt may be opened in the conventional manner while the bridging belt 901 continues to progress towards the head pulley 906 while resting on the pipe belt. At the head pulley 906 the material load discharges and the path of the bridging belt 901 may diverge from that of the conveyor belt 905. This separation of the two belts 901, 905 may be configured to provide space for cleaning of the conveyor belt 905, and to allow the conveyor belt 905 to traverse additional drive pulleys if necessary.

The bridging belt 901 may be guided around a bend pulley 908 and then around a guide wheel 909. The guide wheel 909 may position the attachment-free face of the bridging belt on the medial portion of the conveyor belt in the transition zone 914 where the conveyor belt is being re-formed into a pipe belt. The bridging belt may then be guided around the return portion of the conveyor system by being carried within the empty pipe belt. As the pipe belt approaches the transition zone 920 at the end of the return route, the pipe belt is opened to a flattened profile so that the bridging belt and the conveyor belt may traverse the tail pulley 907 together.

Returning to FIG. 9a, one or more friction drives 912 or 913 may be positioned proximate the conveyor pipe 900 along the vertical or inclined section of the pipe conveyor system. Each friction drive 912 and 913 may include a friction drive tire. In some other examples, the friction drives may comprise a pair friction drive belts biased against opposing faces of the pipe conveyor belt. This engagement of the friction drives with the conveyor pipe results in the friction drives applying pushing forces to the conveyor pipe 900. These forces help push the belt 905, and any material 903 contained therein, from the first horizontal section to the second horizontal section.

In some other embodiments of the pipe conveyor system of FIG. 9a, the bridging belt 901 may be replaced by the types of wire rope-mounted centering configuration described in connection with FIG. 8.

In some other embodiments of the pipe conveyor system of FIG. 9a, the flow of material may be from a higher elevation to a lower elevation, with the tail pulley 907 and feeding device 911 at the higher elevation.

Figure 9B:
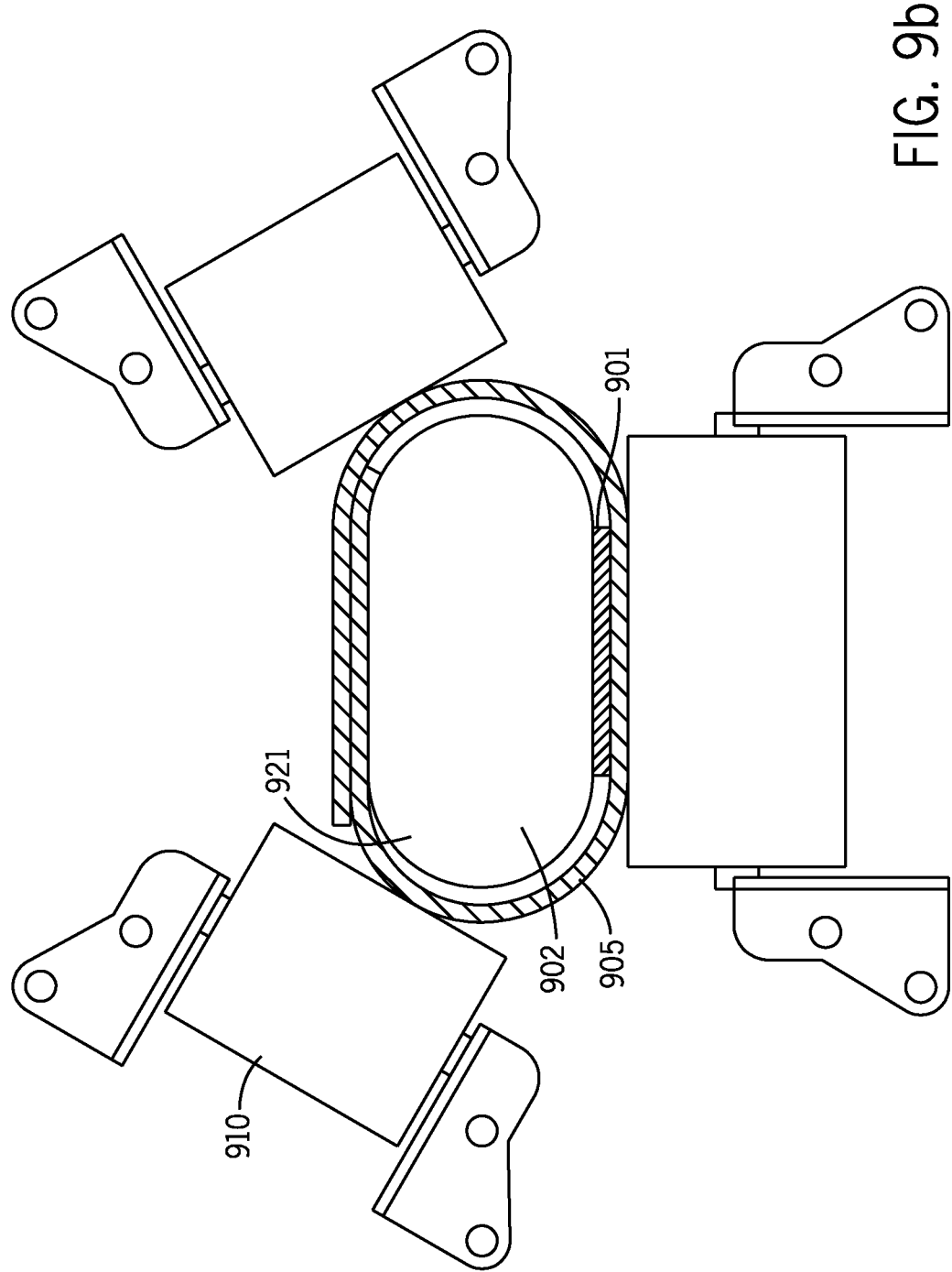
FIG. 9b shows cross section of the pipe tube of FIG. 9a enclosing a centering structure and bridging belt.

FIG. 9b shows in cross section the pipe tube of FIG. 9a that encloses a centering structure and bridging belt. The rounded rectangular form of the pipe belt 905 may be maintained through guidance by idler sets, for example by six-idler sets, only three of which 910 are visible at this transverse section. Also visible in this section are the bridging belt 901 and the face of a centering arch 902, showing the rounded lobe 921 configured to match the inside curvature of the pipe belt.

Figure 10:
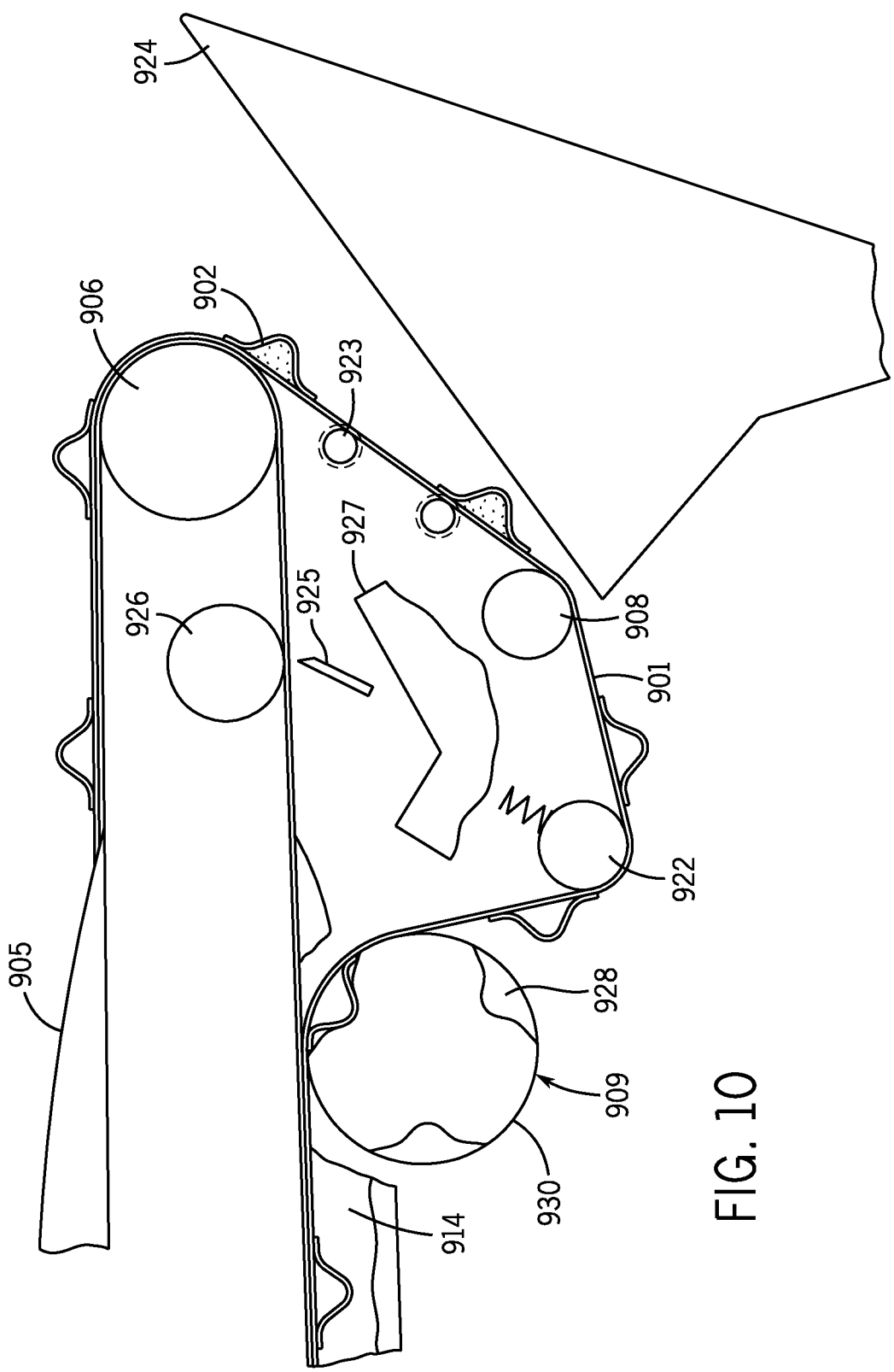
FIG. 10 shows a schematic elevation view of a system for separating the paths of the bridging belt and the pipe belt at the discharge pulley of the pipe conveyor system.

FIG. 10 shows a more detailed view of the head end of the pipe conveyor of FIG. 9a to better illustrate that arrangement for separating the paths of the bridging belt and the pipe belt at the discharge pulley of the pipe conveyor system. A tensioning pulley 922 is added to the configuration shown in FIG. 9a. At the head pulley 906, the material load discharges and the path of the bridging belt 901 may diverge from that of the conveyor belt 905. This separation of the two belts may be configured to provide space for cleaning of the conveyor belt, for shake-out of the bridging belt, to allow the conveyor belt to traverse additional drive pulleys if necessary, and/or to provide for tensioning of the bridging belt.

After traversing the head pulley 906, the conveyor belt may commence a return path by passing next to a belt-cleaner support pulley 926 against which one or more belt cleaners 925 are biased. A dribble-collection apparatus 927 may be configured to capture material dislodged by the belt cleaners, and return the material to the main flow, either by a gravity chute or by a powered means, such as an auxiliary belt or auger. The conveyor belt 905 may then continue to a transition zone where transition idlers may form it into a pipe form for the return route to the tail of the conveyor system.

Part-way around the head pulley 906, the path of the bridging belt may diverge from that of the conveyor belt by passing over of a bend pulley 908. As the bridging belt 901 spans the distance between the head pulley 906 and the bend pulley 908, it may overhang a portion of a discharge chute 924. One or more agitating wheels 923 may be biased against the inner side of the bridging belt to shake carry-back material free from of the bridging belt and from any open spaces within the centering structures 902. The path of the bridging belt 901 may then take the bridging belt 901 around a tensioning pulley 922, which may be provided to maintain a desired tension in the bridging belt 901. A guide wheel 909 may then position the attachment-free face of the bridging belt 901 on the medial portion of the conveyor belt 905 in the transition zone 914 where the conveyor belt 905 is being re-formed into a pipe belt.

The guide wheel 909 may be configured to have a first set of peripheral surfaces 930 arranged to contact and redirect the outer face of the bridging belt 901, as well as a second set of peripheral surfaces or recesses 928 configured to accept the passing centering structures 902. The circumferential pitch of these recesses 928 may match the linear pitch of the centering structures 902 on the bridging belt 901. In some embodiments, the guide wheel 909 may be driven only by the passage of the bridging belt 901. Since both the centering structures 902 and the bridging belt 901 are likely to be quite flexible, and since the bridging belt 901 carries only a low tension, no damage is likely to accrue to any components should the pitch synchronization between the centering structures 902 and the guide wheel recesses 928 somehow be lost.

The bridging belt 901 may then be guided around the return portion of the conveyor system by being carried within the empty pipe belt.

Figure 11:
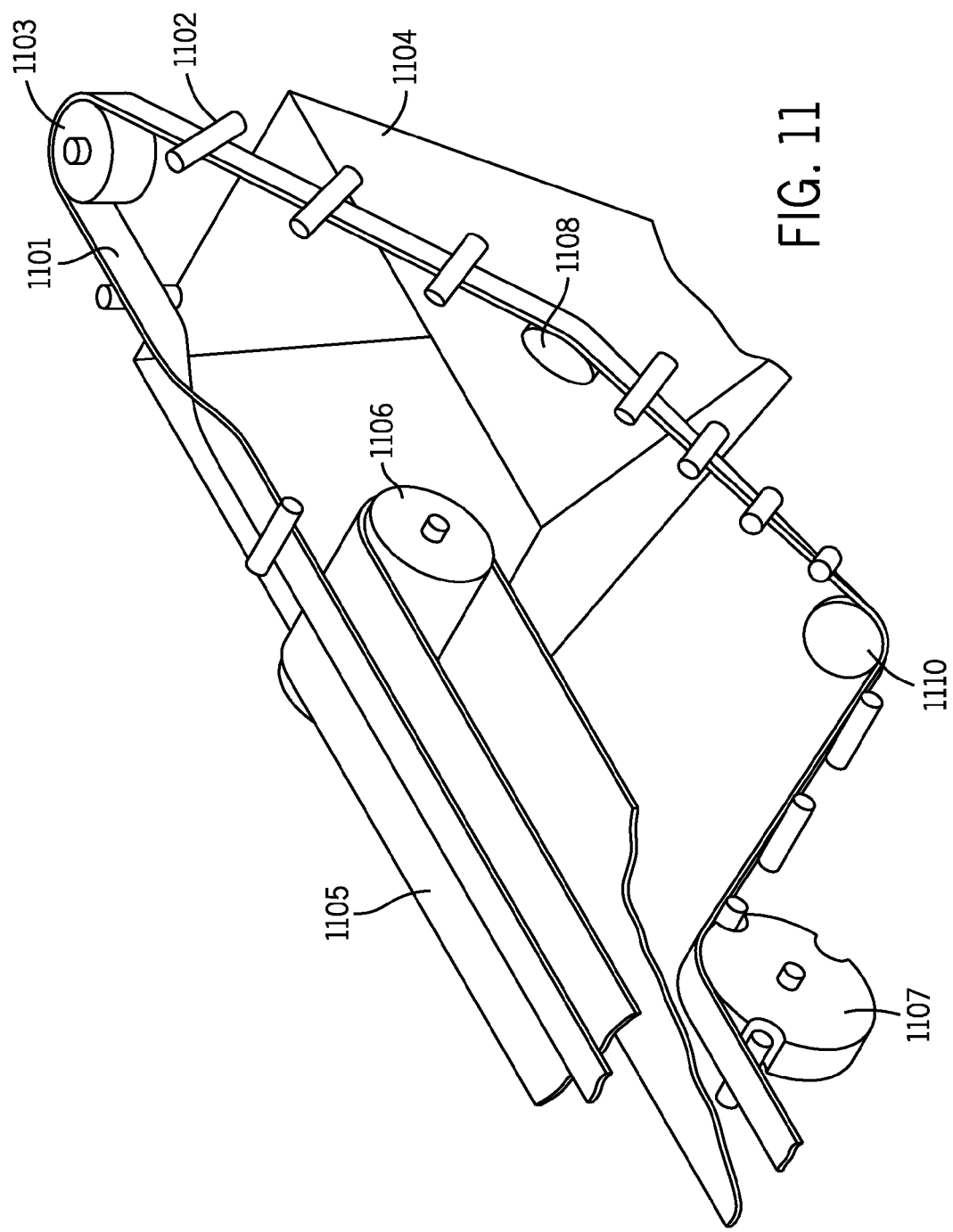
FIG. 11 shows a schematic perspective view of another arrangement for separating the paths of the bridging belt and the pipe belt at the discharge pulley of the pipe conveyor system.

FIG. 11 shows, in an isometric schematic, another example of an arrangement for separating the paths of the bridging belt and the conveyor belt at the discharge pulley of the pipe conveyor system. In this arrangement, the bridging belt 1101 continues in a straight path beyond the head pulley and over the discharge chute, leaving room on the head pulley for conventional belt-cleaning arrangements (which are not shown in the figure). In this figure, most of the centering structures 1102 on the bridging belt 1101 have been omitted from the illustration, with only a few having been illustrated in order to better show the twisting path of the bridging belt 1101.

For the arrangement of FIG. 11, a horizontally-oriented bend pulley 1103 may guide the bridging belt 1101 through a ninety-degree twist as the belt passes above the discharge chute 1104. This allows material that may have been resting on the upper surface of the bridging belt 1101 to fall off into the chute. The bend pulley 1103 may preferably be equipped with guide flanges on each face to help align the bridging belt 1001 with the bend pulley 1103 and to support part of the freely-suspended weight of the bridging belt 1101. The bend pulley 1103 may be equipped with a take-up mechanism in order to provide tensioning to the bridging belt 1101.

After the bridging belt 1101 passes around the bend pulley 1103, additional bend pulleys 1108, 1110 may guide the bridging belt to skirt the discharge chute 1104 and be led to a guide wheel 1107. To provide the desired bridging belt routing, these bend pulleys 1108, 1110 may take advantage of the high flexibility of the bridging belt 1101 and be aligned on axes that are skewed from orthogonal axes associated with the head pulley 1106. The guide wheel 1107 may be configured similarly to the guide wheel 909 described in FIG. 9a, and may include guide flanges to help track the bridging belt 1101. The guide wheel 1107 may be mounted on a skewed axis in order to better conduct the bridging belt 1101 on the desired path. Suitably-configured dribble troughs (not shown in the figure) may be installed if necessary under the path of the bridging belt between the bend pulley 1103 and the guide wheel 1107.

Figure 12:
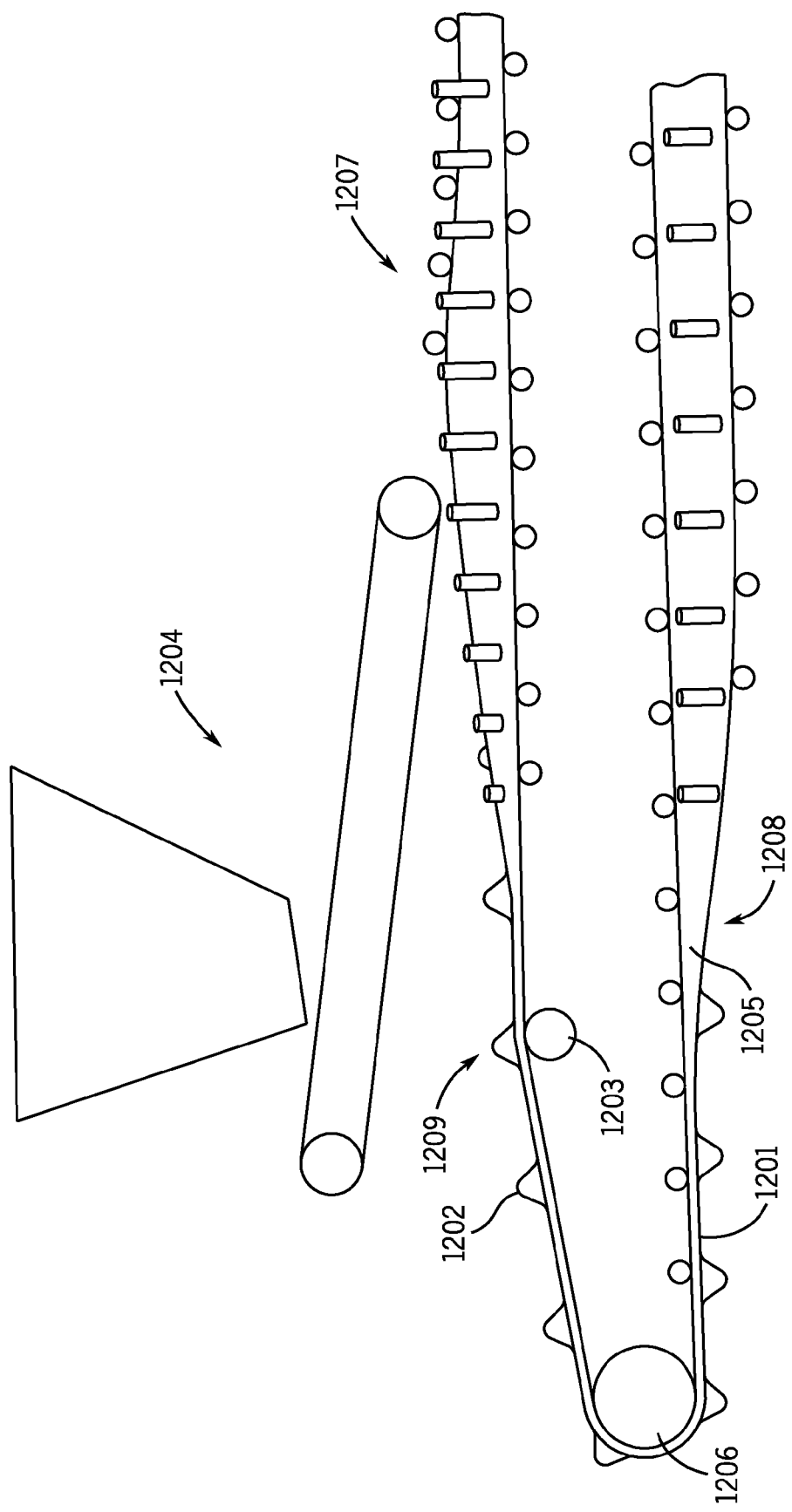
FIG. 12 illustrates a schematic elevation view of the tail end of a pipe conveyor system upstream from the loading zone where a locally convex conveyor path aids in holding the bridging belt stably on the bottom of the pipe conveyor trough.

FIG. 12 is a schematic lateral elevation of the tail end of a pipe conveyor system upstream from the loading zone 1207, where a locally-convex conveyor path 1209 aids in holding the bridging belt stably on the bottom of the pipe conveyor trough. In FIG. 12, a bridging belt 1201 carries a series of centering structures 1202 by moving along in contact with the carry face of the conveyor belt 1205. After emerging from the return pipe in the pipe-opening zone 1208, the bridging belt 1201 may traverse the tail pulley 1206 by riding on the outside of the flattened conveyor belt. In traversing the tail pulley, the bridging belt 1201 may be biased against the conveyor belt by the tensioning applied elsewhere in the conveyor system to the bridging belt 1201. Downstream from the tail pulley 1206, a bend pulley 1203 may deflect the bridging belt and the conveyor belt along a locally-convex path 1209 before the mated belts enter the loading zone 1207 where feeding and metering equipment 1204 may fill the conveyor trough to the desired level, at least partially burying the centering structures. The presence of the convex curve over the bend pulley 1203, combined with the proximity of the tail pulley 1206 and the tension in the bridging belt 1201, will tend to hold the bridging belt 1201 properly seated on the conveyor belt 1205 while material is loaded at the loading zone 1207. While it may be most elegant for the bridging belt to remain well-seated on the bottom of the conveyor belt trough during loading, there will not be any significant consequences if some bulk material does intrude between the conveyor belt and the bridging belt during loading or even later on along the conveying path.

While specific embodiments of the invention have been shown and described in detail to illustrate the application of the principles of the invention, it will be understood that the invention may be embodied otherwise without departing from such principles. For example, although the figures have depicted vertical conveyors, the same principles described herein may be applied to inclined sections of pipe conveyors where the inclines are greater than the surcharge angle of the material being transported. Further, while FIG. 9a shows the pipe conveyor as having one inclined section and two horizontal sections, the system described above could be used with pipe conveyor systems that have multiple inclined and horizontal sections.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other. Reference to "a" or "one" is not intended to limit the description to one only, but may be interpreted as including "one or more than one" unless otherwise specifically indicated by description or context of the related structure or function.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A conveyor system, comprising:
 a pipe conveyor including a head end, a tail end positioned at an elevation different from the head end, and an inclined section between the head end and the tail end;
 the pipe conveyor including a conveyor belt comprising a first portion and a second portion, and the conveyor belt forming a pipe shape when the first and second portions of the conveyor belt are overlapped;
 the pipe shape extending from a pipe closing point to a pipe opening point and enclosing a plurality of longitudinally spaced-apart centering structures;
 at least one of the plurality of longitudinally spaced-apart centering structures enabling self-bridging of a bulk material carried in a pipe volume above the at least one of the plurality longitudinally spaced-apart centering structures; and
 the self-bridging of said bulk material causes a weight of said bulk material to be primarily supported by interaction of said bulk material with walls of the pipe shape.

2. The conveyor system of claim 1, wherein the at least one of the plurality of longitudinally spaced-apart centering structures is sufficiently flexible to conform to the pipe shape when a lump of bulk material is pinched between the at least one of the plurality longitudinally spaced-apart centering structures and the conveyor belt.

3. The conveyor system of claim 1, wherein the plurality of longitudinally spaced-apart centering structures is carried on at least one endless elongate connector not joined to the conveyor belt.

4. The conveyor system of claim 3, wherein the at least one endless elongate connector comprises at least one bridging belt that carries the plurality of longitudinally spaced-apart centering structures on one face of the at least one bridging belt and an opposing face of the at least one bridging belt rests against a carry-side medial surface of the conveyor belt.

5. The conveyor system of claim 4, wherein the at least one of the plurality of longitudinally spaced-apart centering structures comprises mounting flanges, wherein the mounting flanges and the at least one bridging belt are narrower than a circumference of the pipe shape.

6. The conveyer system of claim 5, wherein the at least one of the plurality of longitudinally spaced-apart centering structures further comprises first and second substantially circular portions joined at a common apex by a narrow connecting portion.

7. The conveyor system of claim 3, wherein the at least one endless elongate connector comprises a wire rope, and the plurality of longitudinally spaced-apart centering structures comprises a plurality of spherical centering structures in which the wire rope passes through diametrical axes of the plurality of spherical centering structures.

8. The conveyor system of claim 7, further comprising at least one guide wheel having peripheral recesses that are sized to accept at least one of the plurality of spherical centering structures as the at least one of the plurality of spherical centering structures passes the at least one guide wheel.

9. The conveyor system of claim 3, further comprising at least one bend pulley situated beyond a discharge pulley of the conveyor system that guides the at least one endless elongate connector on a path displaced away from a path of the conveyor belt.

10. The conveyor system of claim 3, wherein the at least one of the plurality of longitudinally spaced-apart centering structures attaches to the at least one endless elongate connector in such a way as to dispose the at least one of the plurality of longitudinally spaced-apart centering structures substantially symmetrically about the at least one endless elongate connector.

11. The conveyor system of claim 1, wherein each of the plurality of longitudinally spaced-apart centering structures is directly attached to a carry-side medial surface of the conveyor belt.

12. The conveyor system of claim 11, wherein at least one of the plurality of longitudinally spaced-apart centering structures is adhered to the carry-side medial surface of the conveyor belt.

13. The conveyor system of claim 1, further including at least one intermediate friction drive at an inclined section of the pipe conveyor, and the least one intermediate friction drive engages external surfaces of the conveyor belt.

14. The conveyor system of claim 13, wherein the plurality of longitudinally spaced-apart centering structures is closely spaced and configured to stiffen opposing walls of the pipe belt against a biasing applied by traction components of the at least one intermediate friction drive.

15. The conveyor system of claim 14, wherein the at least one of the plurality of longitudinally spaced-apart centering structures comprises an arch shaped centering structure.

16. The conveyor system of claim 15, wherein the at least one intermediate friction drive comprises traction drives biased against opposing flattened walls of the conveyer belt, and the plurality of longitudinally spaced-apart centering structures span between the flattened walls.

17. The conveyor system of claim 13, wherein the at least one intermediate friction drive comprises a friction drive tire.

18. The conveyor system of claim 1, wherein at least one of the plurality of longitudinally spaced-apart centering structures comprises one or more footings integrally molded with a cylinder.

19. The conveyor system of claim 1, further comprising a feeding device that feeds the bulk material at a rate that only fractionally fills a plurality of carrying segments defined by the plurality of longitudinally spaced-apart centering structures.

20. The conveyor system of claim 1, wherein the elevation between the head end and the tail end forms an angle that is greater than a surcharge angle of the bulk material carried on the conveyor.

* * * * *